(12) United States Patent
Luo et al.

(10) Patent No.: US 10,862,652 B2
(45) Date of Patent: Dec. 8, 2020

(54) UPLINK SIGNAL ACKNOWLEDGE METHOD AND APPARATUS

(71) Applicant: HUAWEI TECHNOLOGIES CO., LTD., Shenzhen (CN)

(72) Inventors: Jun Luo, Shanghai (CN); Jin Liu, Shenzhen (CN); Pu Yuan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/409,780

(22) Filed: May 11, 2019

(65) Prior Publication Data

US 2019/0268124 A1   Aug. 29, 2019

Related U.S. Application Data

(63) Continuation of application No. PCT/CN2017/105712, filed on Oct. 11, 2017.

(30) Foreign Application Priority Data

Nov. 11, 2016   (CN) .......................... 2016 1 0998760

(51) Int. Cl.
*H04L 5/00* (2006.01)
*H04W 76/27* (2018.01)
(Continued)

(52) U.S. Cl.
CPC ........... *H04L 5/0055* (2013.01); *H04W 16/28* (2013.01); *H04W 52/325* (2013.01);
(Continued)

(58) Field of Classification Search
CPC .... H04L 5/0055; H04W 60/00; H04W 74/08; H04W 52/50; H04W 76/27; H04W 16/28;
(Continued)

(56) References Cited

U.S. PATENT DOCUMENTS

2014/0334366 A1* 11/2014 Hsu ...................... H04W 76/28
                                                                    370/311
2014/0347990 A1* 11/2014 Chimbili ............... H04W 76/00
                                                                    370/235
(Continued)

FOREIGN PATENT DOCUMENTS

CN            101212243 A       7/2008
CN            101237685 A       8/2008
(Continued)

OTHER PUBLICATIONS

3GPP TSG-RAN WG2 Meeting #96, R2-168002, MediaTek Inc.:"Uplink Assistance for NR Mobility in NR", Reno, USA, Nov. 14-18, 2016, total 6 pages. XP051177714.
(Continued)

*Primary Examiner* — Hashim S Bhatti
(74) *Attorney, Agent, or Firm* — Kilpatrick Townsend & Stockton LLP (57) ABSTRACT

Embodiments provide an uplink signal acknowledge method. In the method, an uplink signal sent by a terminal device for tracking the terminal device can be received by a base station or a transmission/reception point (TRP). A downlink tracking acknowledge message can be sent to the terminal device. The downlink tracking acknowledge message can include at least one of the following: information about a status in which the base station or the TRP tracks the terminal device, timing advance information required by the terminal device to send an uplink tracking signal, power adjustment information required by the terminal device to send the uplink signal, and access control information of the terminal device. The base station or the TRP sends the downlink tracking acknowledge message to the terminal device, so that the terminal device learns whether a network has tracked the terminal device.

13 Claims, 3 Drawing Sheets

(51) Int. Cl.

| | | |
|---|---|---|
| *H04W 16/28* | (2009.01) | |
| *H04W 52/32* | (2009.01) | |
| *H04W 56/00* | (2009.01) | |
| *H04W 68/00* | (2009.01) | |
| *H04W 72/04* | (2009.01) | |
| *H04W 60/00* | (2009.01) | |
| *H04W 74/08* | (2009.01) | |
| *H04W 52/50* | (2009.01) | |

(52) U.S. Cl.
CPC ....... *H04W 52/50* (2013.01); *H04W 56/0045* (2013.01); *H04W 60/00* (2013.01); *H04W 68/005* (2013.01); *H04W 72/046* (2013.01); *H04W 74/08* (2013.01); *H04W 76/27* (2018.02)

(58) Field of Classification Search
CPC ........... H04W 52/325; H04W 56/0045; H04W 68/005; H04W 72/046; H04W 8/245; H04W 8/16; H04W 48/14; H04W 52/146; H04W 72/0406
See application file for complete search history.

(56) References Cited

U.S. PATENT DOCUMENTS

| | | |
|---|---|---|
| 2015/0208263 A1 | 7/2015 | Behravan et al. |
| 2017/0214505 A1 | 7/2017 | Zhang et al. |
| 2017/0230869 A1 | 8/2017 | Kubota et al. |
| 2018/0006845 A1 | 1/2018 | Kim et al. |
| 2018/0139651 A1* | 5/2018 | Kim .................... H04L 29/12 |
| 2019/0313467 A1* | 10/2019 | Fujishima .............. H04L 47/78 |

FOREIGN PATENT DOCUMENTS

| | | |
|---|---|---|
| CN | 101296024 A | 10/2008 |
| CN | 101494888 A | 7/2009 |
| CN | 102413557 A | 4/2012 |
| CN | 102572879 A | 7/2012 |
| CN | 102983944 A | 3/2013 |
| CN | 103906120 A | 7/2014 |
| CN | 103975631 A | 8/2014 |
| CN | 104349446 A | 2/2015 |
| CN | 105207705 A | 12/2015 |
| CN | 105682154 A | 6/2016 |
| CN | 105828438 A | 8/2016 |
| EP | 1895722 A1 | 3/2008 |
| WO | 2015037820 A1 | 3/2015 |
| WO | 2015167897 A1 | 11/2015 |
| WO | 2016003336 A1 | 1/2016 |
| WO | 2016111524 A1 | 7/2016 |
| WO | 2016155649 A1 | 10/2016 |

OTHER PUBLICATIONS

3GPP TSG-RAN WG1 #86bis, R1-1609754, Ericsson:"Beam management principles", Lisbon, Portugal, Oct. 10-14, 2016, total 5 pages. XP051149786.

* cited by examiner

UPLINK SIGNAL ACKNOWLEDGE METHOD AND APPARATUS

CROSS-REFERENCE TO RELATED APPLICATIONS

This application is a continuation of International Application No. PCT/CN2017/105712, filed on Oct. 11, 2017, which claims priority to Chinese Patent Application No. 201610998760.5, filed on Nov. 11, 2016, The disclosures of the aforementioned applications are hereby incorporated by reference in their entireties.

TECHNICAL FIELD

The present invention relates to the field of wireless communications, and more specifically, to an uplink signal acknowledge method and apparatus.

BACKGROUND

A measurement manner based on a downlink signal is usually used in radio resource management of an existing wireless communications system. To be specific, a base station sends a downlink reference signal; a terminal device measures parameters such as an RSRP (Reference Signal Received Power, reference signal received power)/RSRQ (Reference Signal Received Quality, reference signal received quality) of the reference signal sent by the base station, and reports a measurement result to the base station; and the base station determines handover and moving of the terminal device based on the measurement result.

Figure 1:
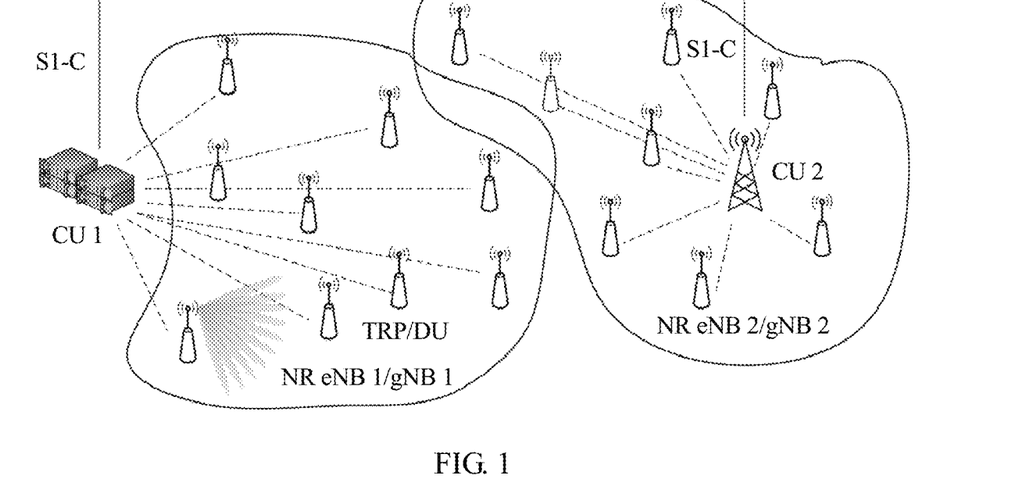
FIG. 1 is a schematic structural diagram of an NR communications system.

In a next-generation wireless communications system, namely, a 5G communications system that is also referred to as an NR (New Radio) system, a plurality of TRPs (Transmission/Reception Point, transmission/reception point) may form one hyper cell (Hyper cell), and the TRPs in the hyper cell share a same cell ID (Hyper cell ID). The terminal device sends an uplink signal, to enable the TRPs in the hyper cell to perform position tracking. Therefore, when moving in the hyper cell, the terminal device does not need to invoke layer 3 signaling, and can move in the hyper cell by using only layer 1 signaling. In addition, network paging may also be performed at a closest TRP instead of being performed in a larger tracking area. This greatly reduces signaling overheads caused by moving of the terminal device. As shown in FIG. 1, a hyper cell on the left includes 9 TRPs, and a hyper cell on the right includes 8 TRPs. The hyper cell may be a service range of an NR base station (eNB/gNB). In other words, one NR base station may include a plurality of TRPs. A plurality of TRPs in the hyper cell is connected to a center control unit (center unit, CU) over a backhaul link, and a plurality of CUs communicate with each other through an S1-C interface.

In the NR system, the base station may include one or more TRPs, and a cell may be a coverage area formed by one or more TRPs. To reduce dependence of radio resource management on frequent and fixed sending of downlink reference signals in a network, and to improve system efficiency, a measurement method based on an uplink signal is introduced. To be specific, the terminal device sends an uplink signal, and a base station or a TRP that is associated with the terminal device, and a neighboring base station or TRP measures the uplink signal sent by the terminal device, and compares and determines measurement results of base stations or TRPs, to determine to hand over the terminal device to a proper cell for service. When the uplink signal is used for measurement, the network can track the terminal device, so that not only the base station or the TRP can track a current position of the terminal device, but also a base station or TRP that can provide currently best transmission can be learned. In uplink measurement, the terminal device can further quickly perform access, thereby reducing a transmitting range of a downlink paging message and paging signaling overheads, and improving network performance. However, currently, the terminal device cannot learn whether the network (the base station or the TRP) has tracked the terminal device. Further, the terminal device cannot adjust the sent uplink signal based on whether the network has tracked the terminal device, either.

SUMMARY

The present invention provides an uplink signal acknowledge method and apparatus, so that a terminal device learns whether a network has tracked the terminal device.

According to a first aspect, an uplink signal acknowledge method is provided, including:

receiving, by a base station or a TRP, an uplink signal that is sent by a terminal device and that is used to track the terminal device; and sending a downlink tracking acknowledge message to the terminal device, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, and access control information of the terminal device.

Herein, there may be one or more base stations or TRPs, and the downlink tracking acknowledge message may include one or more pieces of information.

With reference to the foregoing aspect, the uplink signal is an uplink reference signal or the uplink tracking signal.

With reference to the foregoing aspect, the base station or the TRP is a high frequency base station or a high frequency TRP, and the downlink tracking acknowledge message further includes beam information used by the high frequency base station or the high frequency TRP to track the terminal device, so that the terminal device learns the beam information used for tracking the terminal device.

With reference to the foregoing aspect, the base station or the TRP periodically sends the downlink tracking acknowledge message, or the base station or the TRP sends the downlink tracking acknowledge message based on a trigger event.

With reference to the foregoing aspect, the trigger event includes at least one of the following: a timing advance of the terminal device is to be adjusted, power of the terminal device is to be adjusted, a moving speed of the terminal device exceeds a threshold, and a quantity of uplink tracking signals received by the base station or the TRP exceeds a specified threshold.

With reference to the foregoing aspect, the method further includes: sending, by the base station or the TRP, uplink signal configuration information and/or downlink tracking acknowledge message configuration information to the terminal device. If the base station or the TRP is the high frequency base station or the high frequency TRP, a downlink beam is used for sending.

According to a second aspect, to meet a transmission requirement of a mobile communications system for a large capacity and a high rate, a high frequency band higher than 6 GHz is introduced for communication, to use transmission features of high bandwidth and a high rate. Due to a high path loss of high frequency communication, a narrow beam needs to be used to ensure a propagation distance and a high beam gain. A high frequency base station or a high frequency TRP communicates with a terminal device on a corresponding beam. Therefore, an uplink signal and a downlink tracking acknowledge message are also transmitted on a directivity narrow beam, and an acknowledge method for a high frequency uplink signal includes the following:

receiving, by the high frequency base station or the high frequency TRP, an uplink signal that is sent by the terminal device on an uplink beam and that is used to track the terminal device; and sending a downlink tracking acknowledge message to the terminal device on a downlink beam associated with the uplink beam, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device.

The downlink beam associated with the uplink beam is a downlink beam corresponding to an uplink beam direction, and one uplink beam direction may correspond to one or more downlink beams.

Related features of the technical solution in the first aspect may be all applied to a high frequency-related technical solution in the second aspect.

With reference to the second aspect, after receiving uplink signals that are sent by the terminal device on a plurality of uplink beams and that are used to track the terminal device, the high frequency base station or the high frequency TRP separately sends, for the uplink signals sent on the plurality of uplink beams, the downlink tracking acknowledge message on associated downlink beams. For example, after polling all sending beams, the terminal device may send, for an uplink signal sent on each sending beam, the downlink tracking acknowledge message on an associated downlink beam.

With reference to the second aspect, each time the high frequency base station or the high frequency TRP receives an uplink signal that is sent by the terminal device on one uplink beam and that is used to track the terminal device, the high frequency base station or the high frequency TRP sends, for the uplink signal sent on the uplink beam, the downlink tracking acknowledge message on an associated downlink beam; and then the high frequency base station or the high frequency TRP receives a next uplink signal sent on an uplink beam, and sends, for the next uplink signal sent on the uplink beam, the downlink tracking acknowledge message on an associated downlink beam, until the terminal device polls all sending beams.

It should be noted that different beams may correspond to a same high frequency base station or high frequency TRP, or may correspond to different high frequency base stations or high frequency TRPs.

With reference to the foregoing aspect, the downlink tracking acknowledge message may be sent on some downlink beams associated with uplink beams. For example, the downlink tracking acknowledge message is not fed back on some downlink beams with relatively poor signals, or some uplink beam directions have no corresponding high frequency base station or high frequency TRP.

An uplink signal acknowledge method is further disclosed for the terminal device in the first aspect, including:

sending, by the terminal device to a base station or a TRP, an uplink signal that is used to track the terminal device; and receiving a downlink tracking acknowledge message sent by the base station or the TRP, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, and access control information of the terminal device.

With reference to the foregoing aspect, the method further includes:

entering, by the terminal device, an inactive state to save power of the terminal.

Further, the terminal device may correspondingly adjust the sent uplink signal based on information included in the downlink tracking acknowledge message, for example, advancing sending time, adjusting transmit power, or changing a status of the terminal device.

With reference to the foregoing aspect, the method further includes: receiving, by the terminal device, uplink signal configuration information and/or downlink tracking acknowledge message configuration information sent by the base station or the TRP.

The terminal device may send the uplink signal according to an instruction of the uplink signal configuration information, and receive, according to an instruction of the downlink tracking acknowledge message configuration information, the downlink tracking acknowledge message sent by the base station or the TRP.

An uplink signal acknowledge method is further disclosed for the terminal device in the second aspect, including:

sending, by the terminal device on an uplink beam, an uplink signal that is used to track the terminal device, to a high frequency base station or a high frequency TRP; and receiving, on a downlink beam associated with the uplink beam, a downlink tracking acknowledge message sent by the high frequency base station or the high frequency TRP, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device.

With reference to the foregoing aspect, the method further includes: adjusting, by the terminal device, sending of the uplink signal based on the downlink tracking acknowledge message, for example, advancing sending time, adjusting transmit power, changing a status of the terminal device, or adjusting a beam used for sending the uplink signal.

According to the uplink signal acknowledge method in the first aspect, an uplink signal acknowledge apparatus is further provided, and the apparatus is a base station or a TRP and includes:

a receiving module, configured to receive an uplink signal that is sent by a terminal device and that is used to track the terminal device; and a sending module, configured to send a downlink tracking acknowledge message to the terminal device, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, and access control information of the terminal device.

When the apparatus is a high frequency base station or TRP, the apparatus includes:

a receiving module, configured to receive an uplink signal that is sent by a terminal device on an uplink beam and that is used to track the terminal device; and a sending module, configured to send, on a downlink beam associated with the uplink beam, a downlink tracking acknowledge message to the terminal device, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device.

According to another aspect, the terminal device in the first aspect is further disclosed, including:

a sending module, configured to send, to a base station or a TRP, an uplink signal that is used to track the terminal device; and a receiving module, configured to receive a downlink tracking acknowledge message sent by the base station or the TRP, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, and access control information of the terminal device.

According to still another aspect, the terminal device in the second aspect includes:

a sending module, configured to send, on an uplink beam to a high frequency base station or a high frequency TRP, an uplink signal that is used to track the terminal device; and a receiving module, configured to receive, on a downlink beam associated with the uplink beam, a downlink tracking acknowledge message sent by the high frequency base station or the high frequency TRP, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device.

The base station or the TRP, the terminal device, and related functional modules described above are all based on related procedures of the foregoing uplink signal acknowledge method, and corresponding steps are implemented by corresponding functional modules.

With reference to the foregoing two aspects, the terminal device further includes a state switching module, configured to enable the terminal device to enter an inactive state.

In another form of apparatus embodiment, the receiving module may be implemented by a receiver, the sending module may be implemented by a transmitter, and a function corresponding to another step in another method procedure may be implemented by a processor.

In the technical solutions of the foregoing aspects of the present invention, the base station or the TRP sends the downlink tracking acknowledge message to the terminal device, so that the terminal device learns whether a network has tracked the terminal device. Further, the terminal device may further adjust sending of the uplink signal based on the downlink tracking acknowledge message.

BRIEF DESCRIPTION OF DRAWINGS

To describe the technical solutions in the embodiments of the present invention more clearly, the following briefly describes the accompanying drawings required for describing the embodiments. The accompanying drawings in the following description merely illustrate some embodiments of the present invention, and a person of ordinary skill in the art may derive other drawings from these accompanying drawings without creative efforts.

DESCRIPTION OF EMBODIMENTS

Embodiments of the present invention may be used in wireless networks using various technologies. A radio access network may include different network elements in different systems. For example, in LTE (Long Term Evolution) and LTE-A (LTE Advanced), a network element of a radio access network includes an eNB (eNodeB, evolved NodeB), a network element of a WLAN (wireless local area network)/Wi-Fi includes an access point (Access Point, AP), and a network element in an NR system includes an NR base station (eNB/gNB), a TRP, or the like. Another wireless network may also use a solution similar to the embodiments of the present invention, but related modules in a base station system may be different from those in the embodiments of the present invention. This is not limited in the embodiments of the present invention.

It should be further understood that, in the embodiments of the present invention, a terminal device includes but is not limited to user equipment (UE, User Equipment), a mobile station (MS, Mobile Station), a mobile terminal (Mobile Terminal), a mobile phone (Mobile Telephone), a handset (handset), a portable device (portable equipment), and the like. The user equipment may communicate with one or more core networks through a radio access network (RAN, Radio Access Network). For example, the user equipment may be a mobile phone (or referred to as a "cellular" phone) or a computer with a wireless communication function. The user equipment may alternatively be a portable, pocket-sized, handheld, computer built-in, or in-vehicle mobile apparatus.

An uplink signal acknowledge method proposed in the embodiments of the present invention includes:

after receiving an uplink signal that is sent by a terminal device and that is used to track the terminal device, for example, an uplink tracking signal (UL tracking signal) or an uplink reference signal (UL reference signal), a base station or a TRP sends a downlink tracking acknowledge message to the terminal device, namely, an acknowledge message for the uplink signal, where the downlink tracking acknowledge message includes at least one of the following: information about a status in which the base station or the TRP tracks the terminal device, timing advance information required by the terminal device to send the uplink tracking signal, power adjustment information required by the terminal device to send the uplink signal, and access control information of the terminal device.

The tracking acknowledge message is used to notify the terminal device of whether the base station or the TRP has tracked the terminal device, and may be further used to instruct the terminal device to adjust sending of a subsequent uplink signal.

For example, the downlink tracking acknowledge message may be used to notify the terminal device of a state in which the terminal device is being tracked by a network, and the state may be indicated by using an ACK field of 1 bit; the downlink tracking acknowledge message may also be used to notify the terminal device of the timing advance (Time advance) information required by the terminal device to send the uplink signal, and the timing advance information may be indicated by using a TA field of 11 bits; the downlink tracking acknowledge message may also be used to notify the terminal device of the power adjustment (power control) information required by the terminal device to send the uplink signal, and the power adjustment information may be indicated by using a power adjustment field of 11 bits; and the downlink tracking acknowledge message may also be used to notify the terminal device of the access control information of the terminal device, and the access control information may be indicated by using an AC (Access control) field of 1 bit, for example, instructing the terminal device to switch to an idle state to save power.

Correspondingly, a method performed by the terminal device in the foregoing method includes: sending, to a base station or a transmission/reception point TRP, an uplink signal that is used to track the terminal device; and receiving a downlink tracking acknowledge message sent by the base station or the TRP, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, and access control information of the terminal device. Further, the terminal device may correspondingly adjust sending of the uplink signal based on the foregoing information.

To meet a transmission requirement of a mobile communications system for a large capacity and a high rate, a high frequency band higher than 6 GHz is introduced into an NR system for communication, to use transmission features of high bandwidth and a high rate. Due to a high path loss of high frequency communication, a narrow beam needs to be used to ensure a propagation distance and a high beam gain. Therefore, a high frequency base station or TRP communicates with the terminal device on aligned beams. After receiving an uplink tracking signal (UL tracking signal) or an uplink reference signal (UL reference signal) sent by the terminal device on an uplink beam, the high frequency base station or TRP sends a downlink tracking acknowledge message to the terminal device on a downlink beam associated with the uplink beam. The downlink tracking acknowledge message may be further used to notify the terminal device of beam information used by the high frequency base station or TRP to track the terminal device, and the beam information may be indicated by using a beam info field of 6 bits, such as a beam ID, or a symbol index used to implicitly indicate a beam ID.

Correspondingly, a method performed by the terminal device in the foregoing method includes: sending, by the terminal device on an uplink beam, an uplink signal that is used to track the terminal device, to a high frequency base station or a high frequency TRP; and receiving, on a downlink beam associated with the uplink beam, a downlink tracking acknowledge message sent by the high frequency base station or the high frequency TRP, information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device. Further, the terminal device may correspondingly adjust sending of the uplink signal based on the foregoing information.

Specific fields that may be included in the downlink tracking acknowledge message are shown in the following table. Field names, sequences, and quantities of occupied bits in the table are merely an example. Another name, sequence, and quantity of occupied bits may be used.

| ACK | TA | PC | Beam info | AC |
|---|---|---|---|---|
| 1 bit | 11 bits | 4 bits | 6 bits | 1 bit |

The downlink tracking acknowledge message may be transmitted on a PDSCH (physical downlink shared channel, physical downlink shared channel), and is indicated to the terminal device by using a paging message. The downlink tracking acknowledge message may be alternatively transmitted on a newly defined channel, and a transmission occasion of the channel is configured based on a parameter of the base station or the TRP. The downlink tracking acknowledge message includes a downlink tracking acknowledge message of at least one terminal device or one terminal device group.

When the paging message is used for indication, a paging indication identifier may be used, or a new tracking indication identifier may be defined, to notify the terminal device of information about the downlink tracking acknowledge message. The terminal device or a terminal device group searches a subframe in a paging occasion (Paging Occasion) for the paging indication identifier, for example, a P-RNTI (paging radio network temporary identifier, paging radio network temporary identifier) or a new paging indication identifier such as a TRA-RNTI (Tracking Acknowledge radio network temporary identifier, tracking acknowledge radio network temporary identifier). The P-RNTI or the TRA-RNTI may occupy a PDCCH (physical downlink control channel, physical downlink control channel) resource. When receiving the P-RNTI or the TRA-RNTI, the terminal device or the terminal device group learns a corresponding time-frequency resource according to a resource indication corresponding to the P-RNTI/TRA-RNTI, and decodes PDSCH content on the corresponding time-frequency resource, to obtain a downlink tracking acknowledge message corresponding to the terminal device or the terminal device group.

When the newly defined channel is used for indication, the terminal device searches a subframe in a TRA occasion (Tracking Acknowledge Occasion, tracking acknowledge occasion), that is, in a transmission occasion of the downlink tracking acknowledge message, for a tracking indication identifier on a PDCCH channel, such as a newly defined TRA-RNTI. The TRA-RNTI is used to notify the terminal device of information about the downlink tracking acknowledge message. When receiving the TRA-RNTI, the terminal device or the terminal device group learns a corresponding time-frequency resource according to a resource indication corresponding to the TRA-RNTI, and decodes PDSCH content on the corresponding time-frequency resource, to obtain a downlink tracking acknowledge message corresponding to the terminal device identifier or the terminal device group.

Alternatively, the terminal device searches for a newly defined PTRANCH (physical tracking acknowledge message notification channel) in a subframe in a TRA occasion, and the channel includes a downlink tracking acknowledge message corresponding to the terminal device identifier or the terminal device group.

In the foregoing manner, a transmission occasion in the TRA occasion may be configured by the base station or the TRP by using an RRC (radio resource control) message.

Figure 2:
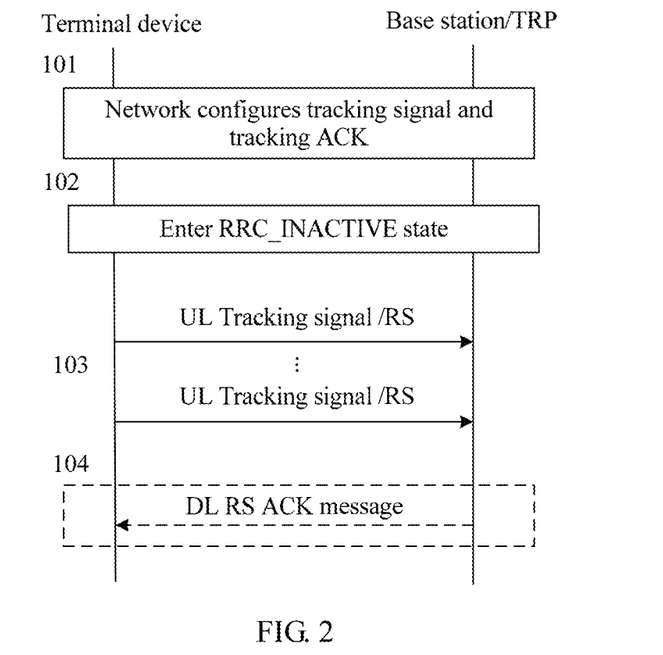
FIG. 2 is a schematic flowchart of an uplink signal acknowledge method according to an embodiment of the present invention.

An uplink signal acknowledge method proposed in the embodiments of the present invention is further described below with reference to the accompanying drawings. Referring to FIG. 2, the method includes the following steps.

101. A base station or a TRP delivers uplink signal configuration information and/or downlink tracking acknowledge message configuration information to a terminal device.

After the terminal device accesses a base station or a TRP, where there may be one or more TRPs, the base station or the TRP delivers the uplink signal configuration information to the terminal device, to notify the terminal device of a manner of sending an uplink tracking signal or an uplink reference signal. After receiving the uplink signal configuration information, the terminal may send an uplink signal based on the configuration information.

In addition, the base station or the TRP delivers the downlink tracking acknowledge message configuration information to the terminal device, to notify the terminal device of a manner of receiving a downlink tracking acknowledge message sent by the base station or the TRP. For example, the base station or the TRP adds the downlink tracking acknowledge message configuration information to an RRC message (for example, an RRC reconfiguration), to notify the terminal device of one or more pieces of the following information: a manner of sending the downlink tracking acknowledge message (periodic sending or event triggering), a sending period, a transmission occasion, and a triggering type. After receiving the downlink tracking acknowledge message configuration information, the terminal may receive, based on the configuration information, the downlink tracking acknowledge message sent by the base station or the TRP.

An instruction of the downlink tracking acknowledge message configuration information may be sent in the following two manners.

(a) Periodic sending manner: The base station or the TRP sends the downlink tracking acknowledge message in a transmission occasion (TO, Transmission Occasion) at a period T.

(b) Event triggering manner: The base station or the TRP may send the downlink tracking acknowledge message after being triggered by a specific event. For example, the event may include but is not limited to any one or more of the following: a timing advance of the terminal device needs to be adjusted, power of the terminal device needs to be adjusted, a moving speed of the terminal device exceeds a threshold, and the TRP or the base station receives a plurality of uplink tracking signals, namely, a quantity of uplink tracking signals exceeds a specified threshold.

When the event triggering manner is used, the terminal device may be instructed, in a paging period or a transmission occasion by using a paging message or another instruction message, to read the downlink tracking acknowledge message.

After receiving the downlink tracking acknowledge message configuration information, the terminal device may determine a manner of receiving the downlink tracking acknowledge message, for example, periodic receiving; or receive the paging message or the another instruction message, and receive the downlink tracking acknowledge message according to an instruction of the paging message or the another instruction message.

102. The terminal device enters an inactive state.

This step is an optional step, and is to save power of the terminal device. The inactive state of the terminal device is a new state other than an RRC idle state and an RRC active state. In this state, the TRP or the base station stores context of the terminal device, and a dedicated terminal device ID may be allocated by a network to the terminal device. The terminal device ID is a unique identifier in a hyper cell. The terminal device in the inactive state does not need to be switched to the active state when expecting to transmit uplink data. When the network expects to initiate downlink data transmission to the terminal device in the inactive state, the network may directly page the terminal device during paging, or perform downlink transmission in a resource indication manner during a period (for example, during paging).

103. The terminal device sends an uplink signal to the base station or the TRP, so that the base station or the TRP that receives the uplink signal tracks the terminal device.

The terminal device may send the uplink tracking signal or the uplink reference signal to the base station or the TRP based on the uplink tracking signal configuration information in step 101.

104. The base station or the TRP sends a downlink tracking acknowledge message to the terminal device.

The terminal device receives the downlink tracking acknowledge message in a corresponding transmission occasion, and may adjust sending of the uplink signal based on content included in the downlink tracking acknowledge message.

For example, an ACK field in the downlink tracking acknowledge message may be used to determine status information indicating whether the network (namely, the base station or the TRP) has tracked the terminal device. If the terminal device is tracked by the network, the uplink tracking signal may be still sent based on the uplink tracking signal configuration information; or if the downlink tracking acknowledge message sent by the base station or the TRP is not received in specified period of time, it indicates that the terminal device is not tracked by the network, and sending of the uplink tracking signal or the uplink reference signal is canceled, or frequency of sending the uplink tracking signal or the uplink reference signal is increased to increase a possibility of tracking the terminal device, or the terminal device uses a downlink measurement manner. Further, the terminal device may alternatively enter an idle state to save power.

In addition, after receiving the downlink tracking acknowledge message in the corresponding transmission occasion, the terminal device may further obtain, based on a TA field in the downlink tracking acknowledge message, timing advance (TA) information indicated by the network (namely, the base station or the TRP), and adjust sending time of the uplink tracking signal based on the TA information, so that time at which the TRP or the base station receives the uplink tracking signal or the uplink reference signal is within a specific range.

In addition, after receiving the downlink tracking acknowledge message in the corresponding transmission occasion, the terminal device may further learn, based on a PC field in the downlink tracking acknowledge message, power control (power control, PC) information indicated by the network (namely, the base station or the TRP), and adjust transmit power of the uplink tracking signal based on the PC information, so that power of the uplink tracking signal or the uplink reference signal received by the TRP or the base station is within a specific range.

In addition, after receiving the downlink tracking acknowledge message in the corresponding transmission occasion, the terminal device may further learn, based on an AC field in the downlink tracking acknowledge message, access control (Access control) information indicated by the network (namely, the base station or the TRP), and adjust a status of the terminal device based on the AC information. For example, the terminal device is switched from the inactive state to the idle state to save power.

If the downlink tracking acknowledge message is sent by a high frequency base station or TRP, after receiving the downlink tracking acknowledge message, the terminal device may further learn, based on a beam info field in the downlink tracking acknowledge message, beam information that is indicated by the high frequency base station or TRP and that is used for sending the uplink tracking signal, namely, information about a beam by using which the terminal device is tracked, so that the terminal device determines an optimal beam direction used for sending the uplink tracking signal, and can select a beam when subsequently sending the uplink tracking signal.

In the uplink signal acknowledge method disclosed in the foregoing embodiment, the base station or the TRP sends the downlink tracking acknowledge message to the terminal device, to notify the terminal device of a state that the terminal device is being tracked by the network, and the downlink tracking acknowledge message may also be used to instruct the terminal device to subsequently send the uplink signal.

An uplink signal acknowledge method for a high frequency base station or TRP includes:

receiving, by the high frequency base station or the high frequency TRP, an uplink signal that is sent by a terminal device on an uplink beam and that is used to track the terminal device; and sending a downlink tracking acknowledge message to the terminal device on a downlink beam associated with the uplink beam, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device.

Different from the foregoing embodiment, the high frequency base station or the high frequency TRP communicates with the terminal device by using a beam pair, and the uplink signal and the downlink tracking acknowledge message are sent on corresponding beams. Likewise, uplink signal configuration information and downlink tracking acknowledge message configuration information are also sent on corresponding beams. Other features are similar to those in the foregoing embodiment, and details are not described herein again.

In addition, for a high frequency NR system, the high frequency TRP or base station communicates with the terminal device on a corresponding beam. For example, the terminal device sends the uplink signal (the uplink tracking signal or the uplink reference signal) on different beams through beam sweeping. Therefore, after the terminal device sends the uplink tracking signal through beam sweeping, the base station or the TRP sends the downlink tracking acknowledge message through beam sweeping. The downlink tracking acknowledge message may be sent in a downlink beam corresponding to a beam direction of each uplink tracking signal, or may be sent in one or more optimal beam directions. One uplink beam may correspond to one or more downlink beams. The downlink tracking acknowledge message may include a downlink tracking acknowledge message of one terminal device or one terminal device group. In addition, the downlink tracking acknowledge message may not be sent in some uplink beam directions with relatively poor signals.

In an embodiment, after receiving uplink signals that are sent by the terminal device on a plurality of uplink beams and that are used to track the terminal device, the high frequency base station or the high frequency TRP separately sends, for the uplink signals sent on the plurality of uplink beams, the downlink tracking acknowledge message on downlink beams associated with the plurality of uplink beams. For example, after polling all sending beams, the terminal device may send, for an uplink signal sent on each sending beam, the downlink tracking acknowledge message on an associated downlink beam.

Figure 3:
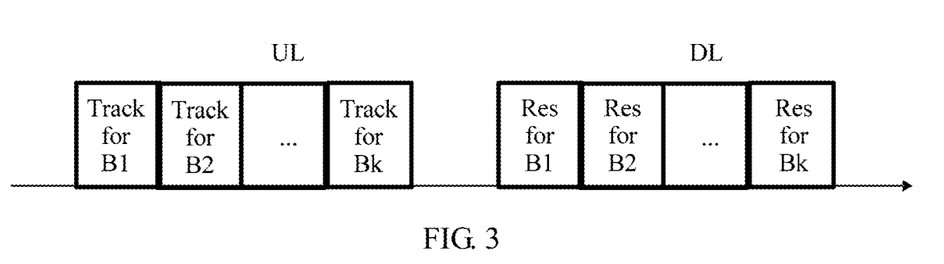
FIG. 3 is a schematic diagram of a manner of sending a downlink tracking acknowledge message according to an embodiment of the present invention.

For example, as shown in FIG. 3, the terminal device separately sends an uplink tracking signal (or an uplink reference signal) on a beam B1 to a beam Bk through beam sweeping. After the beam sweeping, namely, after the uplink tracking signal is sent on all the beam B1 to the beam Bk, for the uplink tracking signal sent on each beam, the base station or the TRP sends, for the beam B1 to the beam Bk, a downlink tracking acknowledge message through beam sweeping on corresponding downlink beams.

An advantage of the foregoing manner is avoiding that the terminal device is frequently switched between beam sending and beam receiving. The foregoing manner is suitable for a case in which there are a relatively small quantity of beams.

There is another manner in which the high frequency base station or TRP sends the downlink tracking acknowledge message. For an uplink tracking signal sent in each beam direction, a downlink tracking acknowledge message is sent in a corresponding downlink direction. The downlink tracking acknowledge message may be sent in a downlink beam direction corresponding to a direction in which the TRP can receive the uplink tracking signal, or may be sent in each downlink beam direction. The downlink tracking acknowledge message includes a downlink tracking acknowledge message of at least one terminal device or one terminal device group.

In another embodiment, after receiving an uplink signal that is sent by the terminal device on one uplink beam and that is used to track the terminal device, the high frequency base station or the high frequency TRP sends, for the uplink signal sent on the uplink beam, the downlink tracking acknowledge message on an associated downlink beam. Then the high frequency base station or the high frequency TRP receives a next uplink signal sent on an uplink beam, and sends the downlink tracking acknowledge message on an associated downlink beam for the next uplink signal sent on the uplink beam, until the terminal device polls all sending beams.

Figure 4:
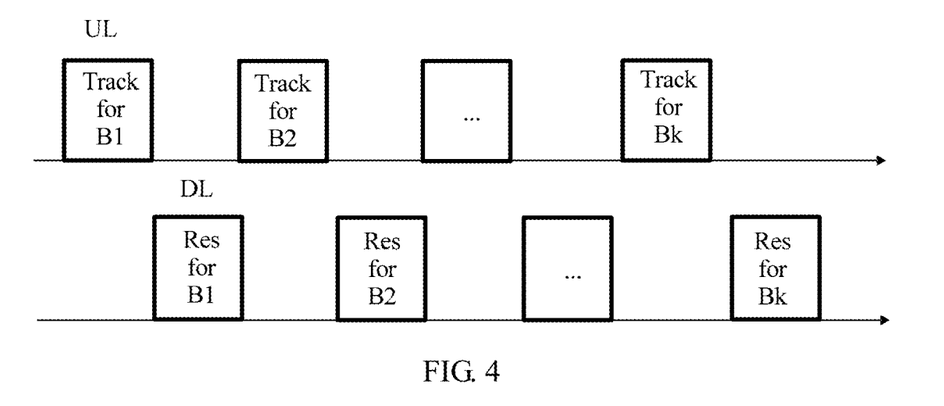
FIG. 4 is a schematic diagram of a manner of sending a downlink tracking acknowledge message according to another embodiment of the present invention.

For example, as shown in FIG. 4, the terminal device sends an uplink tracking signal (or an uplink reference signal) on a beam B1, and the TRP or the base station sends a downlink tracking acknowledge message in a downlink beam direction corresponding to a B1 direction; and the terminal device sends an uplink tracking signal on a beam B2, and the TRP or the base station sends a downlink tracking acknowledge message in a downlink beam direction corresponding to a B2 direction until an uplink tracking signal is sent in a beam Bk direction, and the TRP or the base station sends a downlink tracking acknowledge message in a downlink beam direction corresponding to a Bk direction.

An advantage of the manner is that the base station or the TRP can quickly determine a beam direction of the uplink signal. After determining an optimal beam direction, the terminal device may not send an uplink signal in transmission occasions corresponding to remaining beam directions, to reduce tracking overheads. In addition, in a subsequent uplink signal sending period, the terminal may send an uplink tracking signal and perform beam sweeping in the optional uplink beam direction in a previous period, to find an optimal beam direction more quickly.

In the foregoing embodiments, the downlink tracking acknowledge message may be sent on downlink beams corresponding to only some uplink beam directions. For example, the downlink tracking acknowledge message is sent in a beam direction with a relatively good signal instead of a beam direction with a relatively poor signal.

Figure 5:
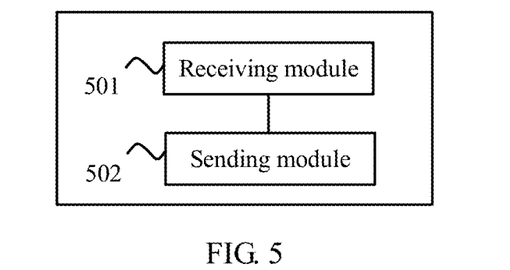
FIG. 5 is a schematic diagram of an uplink signal acknowledge apparatus according to an embodiment of the present invention.

According to the uplink signal acknowledge method in the foregoing embodiments, an uplink signal acknowledge apparatus is further provided, and the apparatus is a base station or a TRP. Referring to FIG. 5, the apparatus includes:

a receiving module 501, configured to receive an uplink signal that is sent by a terminal device and that is used to track the terminal device; and a sending module 502, configured to send a downlink tracking acknowledge message to the terminal device, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, and access control information of the terminal device.

When the apparatus is a high frequency base station or a high frequency TRP, referring to FIG. 5, the apparatus includes:

a receiving module 501, configured to receive an uplink signal that is sent by a terminal device on an uplink beam and that is used to track the terminal device; and a sending module 502, configured to send a downlink tracking acknowledge message to the terminal device on a downlink beam associated with the uplink beam, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device.

Figure 6:
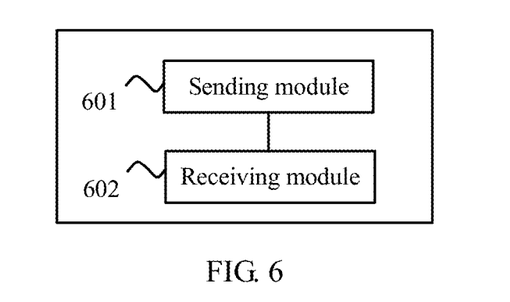
FIG. 6 is a schematic diagram of a terminal device according to an embodiment of the present invention.

Referring to FIG. 6, the terminal device in the foregoing method embodiments includes:

a sending module 601, configured to send, to a base station or a TRP, an uplink signal that is used to track the terminal device; and a receiving module 602, configured to receive a downlink tracking acknowledge message sent by the base station or the TRP, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, and access control information of the terminal device.

If a high frequency NR system is used, referring to FIG. 6, the terminal device in the foregoing method embodiments includes:

a sending module 601, configured to send, on an uplink beam to a high frequency base station or a high frequency TRP, an uplink signal that is used to track the terminal device; and a receiving module 602, configured to receive, on a downlink beam associated with the uplink beam, a downlink tracking acknowledge message sent by the high frequency base station or the high frequency TRP, where the downlink tracking acknowledge message includes at least one of the following: information about a status in which the base station or the TRP tracks the terminal device, timing advance information required by the terminal device to send an uplink tracking signal, power adjustment information required by the terminal device to send the uplink signal, access control information of the terminal device, and beam information used by the high frequency base station or the high frequency TRP to track the terminal device.

The foregoing terminal device may further include a state switching module, configured to enable the terminal device to enter an inactive state.

In the foregoing apparatus embodiments, corresponding functional modules are configured to perform corresponding steps in the method embodiments. For specific steps, refer to corresponding methods, and other corresponding steps may also be implemented by corresponding modules. Details are not described herein again.

In another form of apparatus embodiment, the receiving module may be implemented by a receiver, the sending module may be implemented by a transmitter, and a corresponding function in another method may be implemented by a processor. For details, refer to FIG. 7. Details are not described herein again.

Figure 7:
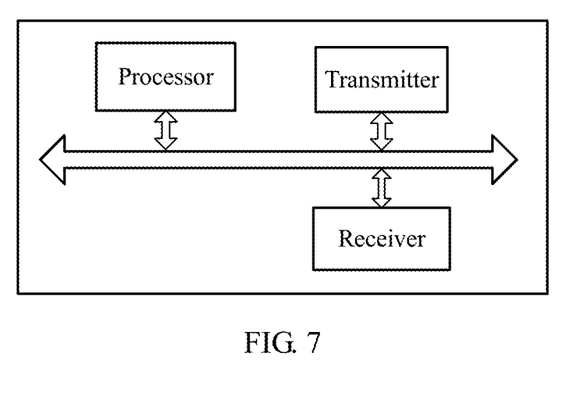
FIG. 7 is a schematic diagram of an uplink signal acknowledge apparatus or a terminal device according to another embodiment of the present invention.

Optionally, components of the device shown in FIG. 7 are coupled together by using a bus system, and in addition to a data bus, the bus system further includes a power bus, a control bus, and a status signal bus.

It should be understood that in the embodiments of the present invention, the processor may be a central processing unit (Central Processing Unit, "CPU" for short), or the processor may be another general purpose processor, a digital signal processor (DSP), an application-specific integrated circuit (ASIC), a field programmable gate array (FPGA) or another programmable logic device, a discrete gate or a transistor logic device, a discrete hardware component, or the like. The general purpose processor may be a microprocessor, or the processor may be any conventional processor or the like.

The memory may include a read-only memory and a random access memory, and provide an instruction and data to the processor. A part of the memory may further include a non-volatile random access memory. For example, the memory may further store information of a device type.

The bus system may further include a power bus, a control bus, a status signal bus, and the like, in addition to a data bus. However, for clear description, various types of buses in the figure are marked as the bus system.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division or may be other division in actual implementation. For example, a plurality of units or components may be combined or integrated into another system, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An uplink signal acknowledge method, comprising:
receiving, by a base station or a transmission/reception point (TRP), an uplink signal sent by a terminal device for tracking the terminal device; and
sending a downlink tracking acknowledge message to the terminal device, wherein the downlink tracking acknowledge message comprises at least one of the following: information about a status in which the base station or the TRP tracks the terminal device, timing advance information required by the terminal device to send an uplink tracking signal, power adjustment information required by the terminal device to send the uplink signal, or access control information of the terminal device; and, wherein
the base station or the TRP is a high frequency base station or a high frequency TRP, and the downlink tracking acknowledge message further comprises beam information used by the high frequency base station or the high frequency TRP to track the terminal device.

2. The method according to claim 1, wherein the base station or the TRP periodically sends the downlink tracking acknowledge message, or the base station or the TRP sends the downlink tracking acknowledge message based on a trigger event.

3. The method according to claim 2, wherein the trigger event comprises at least one of the following: a timing advance of the terminal device is to be adjusted, power of the terminal device is to be adjusted, a moving speed of the terminal device exceeds a threshold, and a quantity of uplink tracking signals received by the base station or the TRP exceeds a specified threshold.

4. The method according to claim 1, wherein before receiving, by the base station or a transmission/reception point TRP, an uplink signal that is sent by a terminal device and that is used to track the terminal device, the method further comprises: sending, by the base station or the TRP, uplink signal configuration information and/or downlink tracking acknowledge message configuration information to the terminal device.

5. An uplink signal acknowledge method, comprising:
sending, by a terminal device to a base station or a transmission/reception point (TRP), an uplink signal for tracking the terminal device; and
receiving a downlink tracking acknowledge message sent by the base station or the TRP, wherein the downlink tracking acknowledge message comprises at least one of the following: information about a status in which the base station or the TRP tracks the terminal device, timing advance information required by the terminal device to send an uplink tracking signal, power adjustment information required by the terminal device to send the uplink signal, or access control information of the terminal device; and, wherein
the base station or the TRP is a high frequency base station or a high frequency TRP, and the downlink tracking acknowledge message further comprises beam information used by the high frequency base station or the high frequency TRP to track the terminal device.

6. The method according to claim 5, wherein before the receiving, by a base station or a transmission/reception point TRP, an uplink signal sent by a terminal device for tracking the terminal device, the method further comprises:
entering, by the terminal device, an inactive state.

7. An uplink signal acknowledge apparatus, wherein the apparatus is a base station or a transmission/reception point (TRP), and comprises:
a receiver, configured to receive an uplink signal sent by a terminal device for tracking the terminal device; and
a transmitter, configured to send a downlink tracking acknowledge message to the terminal device, wherein the downlink tracking acknowledge message comprises at least one of the following: information about a status in which the base station or the TRP tracks the terminal device, timing advance information required by the terminal device to send an uplink tracking signal, power adjustment information required by the terminal device to send the uplink signal, and access control information of the terminal device; and, wherein
the base station or the TRP is a high frequency base station or a high frequency TRP, and the downlink tracking acknowledge message further comprises beam information used by the high frequency base station or the high frequency TRP to track the terminal device.

8. The apparatus according to claim 7, wherein the base station or the TRP is a high frequency base station or a high frequency TRP, and the downlink tracking acknowledge message further comprises beam information used by the high frequency base station or the high frequency TRP to track the terminal device.

9. The apparatus according to claim 7, wherein the transmitter is further configured to periodically send the downlink tracking acknowledge message, or send the downlink tracking acknowledge message based on a trigger event.

10. The apparatus according to claim 9, wherein the trigger event comprises at least one of the following: a timing advance of the terminal device is to be adjusted, power of the terminal device is to be adjusted, a moving speed of the terminal device exceeds a threshold, and a quantity of uplink tracking signals received by the base station or the TRP exceeds a specified threshold.

11. The apparatus according to claim 7, the transmitter is further configured to send uplink signal configuration information and/or downlink tracking acknowledge message configuration information to the terminal device.

12. A terminal device, comprising:
a transmitter, configured to send, to a base station or a transmission/reception point (TRP), an uplink signal for tracking the terminal device; and
a receiver, configured to receive a downlink tracking acknowledge message sent by the base station or the TRP, wherein the downlink tracking acknowledge message comprises at least one of the following: information about a status in which the base station or the TRP tracks the terminal device, timing advance information required by the terminal device to send an uplink tracking signal, power adjustment information required by the terminal device to send the uplink signal, and access control information of the terminal device; and, wherein the base station or the TRP is a high frequency base station or a high frequency TRP, and the downlink tracking acknowledge message further comprises beam information used by the high frequency base station or the high frequency TRP to track the terminal device.

13. The terminal device according to claim 12, wherein the terminal device further comprises:
a processor, configured to enable the terminal device to enter an inactive state.

* * * * *